United States Patent [19]

Harlan, Jr. et al.

[11] 3,984,369

[45] Oct. 5, 1976

[54] SEALANT

[75] Inventors: James T. Harlan, Jr.; David J. St. Clair, both of Torrance, Calif.

[73] Assignee: Shell Oil Company, Houston, Tex.

[22] Filed: May 15, 1975

[21] Appl. No.: 577,578

[52] U.S. Cl. .................. 260/33.6 AQ; 260/27 BB; 260/31.2 MR; 260/32.8 A; 260/33.6 A
[51] Int. Cl.² ..................... C08K 5/01; C08K 5/07; C08K 5/11
[58] Field of Search ............... 260/876 B, 33.6 AQ, 260/32.8 A

[56] References Cited

UNITED STATES PATENTS

| | | | |
|---|---|---|---|
| 3,239,478 | 3/1966 | Harlan | 260/876 B |
| 3,658,740 | 4/1972 | Marrs et al. | 260/876 B |
| 3,850,858 | 11/1974 | Park | 260/876 B |
| 3,870,676 | 3/1975 | Condon | 260/880 B |

OTHER PUBLICATIONS

Hackh's—Chemical Dictionary (3rd ed.) (McGraw-Hill) (N.Y.) (1974), p. 151.

*Primary Examiner*—Donald E. Czaja
*Assistant Examiner*—H. H. Fletcher

[57] ABSTRACT

Sealant compositions exhibiting good substrate/sealant adhesion comprise 3 to 30 percent by weight of a block copolymer, 2 to 40 percent by weight butyl rubber, 10 to 70 percent by weight of a plasticizing oil having a solubility parameter ranging from 6 to 8, about 1 to about 50 percent by weight of an adhesion promoting resin having a solubility parameter ranging from about 8 to about 12, about 1 to about 70 percent by weight of an inorganic filler and about 0.01 to about 2.0 percent by weight of a UV/oxidation stabilizer or a mixture of UV/oxidation stabilizers.

7 Claims, No Drawings

SEALANT

BACKGROUND OF THE INVENTION

Block copolymers composed poly(alpha-monalkenyl at least two poly(alpha-monoalkenyl arene) blocks and at least one elastomeric poly(conjugated diene) block or hydrogenated or partially hydrogenated derivatives thereof have offered potentially attractive properties in sealant compositions but have found limited use in commercial application because conventional methods of applying the sealant directly to the substrate have failed to produce adequate long term adhesion especially on exposure to water. Formulations containing these block copolymers have excellent hardness, tensile, and flexibility properties but exhibit inadequate (less than 5 pounds per linear inch width (pli)) 180° peel strength for most high performance sealant applications in tests against glass or aluminum after 7 days in water.

The composition of this invention retains the useful hardness, tensile and flexibility properties exhibited by the conventional block copolymer sealants and in addition shows satisfactory (greater than 20 pli) 180° peel strength after 7 days in water.

SUMMARY OF THE INVENTION

The invention relates to a block copolymer sealant composition comprising about 3 to about 30 percent by weight of a poly(alpha-monalkenyl arene)elastomeric hydrogenated poly(conjugated diene) block copolymer, about 2 to about 40 weight percent of a butyl rubber, about 10 to about 70 percent by weight of a plastizing oil having a solubility parameter in the range of about 6 to about 8, about 1 to about 50 percent by weight of an adhesion promoting resin having a solubility parameter of 8 to 12, about 1 to about 70 percent by weight of an inorganic filler and about 0.01 to about 2.0 percent by weight of UV/oxidative stabilizer(s).

DESCRIPTION OF THE PREFERRED EMBODIMENTS

The Block Copolymer

The block copolymers of this invention are those containing at least two poly(alpha-monalkenyl arene) blocks and at least one elastomeric poly(conjugated diene) block or hydrogenated or partially hydrogenated derivatives thereof. These polymers can be either linear, radial or comb type, depending on how the block copolymer is formed. The poly(alpha-monalkenyl arene) blocks may have an average molecular weight ranging from about 4000 to about 50,000, preferably from about 7000 to about 25,000 and most preferably from about 7,500 to about 10,000. The alpha-monalkenyl aromatic monomer may be styrene, alphamethylstyrene or alkyl ring substituted styrenes where the alkyl group contains 4 or less carbon atoms and there are 2 or less of these alkyl groups.

The elastomeric poly(conjugated diene) block(s) has an average molecular weight in the range of from 18,000 to about 250,000, preferably from 25,000 to about 100,000 and most preferably from about 27,000 to about 50,000. The poly(conjugated diene) block which is hydrogenated contains at least 20 percent, preferably at least 35 percent of the monomer units polymerized in the 1,2 configuration. Hydrogenation (saturation) of these poly(conjugated diene) blocks is carried out to a point where at least 95 percent of the double bonds are saturated, preferably at least 99 percent are saturated. Less than 10 percent of the aromatic double bonds of the poly(alpha-monalkenyl arene) block are hydrogenated; preferably less than 2 percent are hydrogenated. The preferred conjugated diene monomers are isoprene and butadiene and mixtures thereof. Butadiene is the most preferred.

The preferred block copolymers are the polystyrene/hydrogenated polybutadiene/polystyrene and polystyrene/hydrogenated polyisoprene/polystyrene linear block copolymers.

The Butyl Rubber

The butyl rubbers used in the sealants of this invention are any uncrosslinked or lightly crosslinked isobutylene-isoprene or isobutylene-butadiene copolymers having a viscosity-average molecular weight in the range of about 200,000 to about 600,000, preferably about 350,000 to about 450,000. The Mooney viscosity may vary from about 35 to about 55, preferably from about 40 to about 50. These butyl rubbers are used at about the 2 to about the 40 percent by weight level, preferably at about the 5 to about the 30 percent by weight level and most preferably at about the 10 to about the 15 percent by weight level. Preferred butyl rubbers are Exxon 077, Bucar 5000, and Bucar 5214.

Plasticizing Oil

The plasticizing oils are those paraffinic/naphthenic or synthetic oils having a solubility parameter between about 6 and about 8, preferably between about 6.5 and about 7.5. The viscosity of the oils range from about 20 centistokes to about 170,000 centistokes at 38°C, preferably from about 3,000 to about 30,000. The oil comprises about 1 to about 70 percent by weight of the sealant, preferably about 10 to about 50 percent weight and most preferably about 30 to about 40 percent weight. Preferred oils are low molecular weight cationicly polymerized polybutene oligomers, and highly refined, aromatic free hydrocarbon oils or mixtures thereof and the atactic polypropylene oils.

Adhesion Promoting Resins

The adhesion promoting resins used in the compositions of this invention are selected from those resins which are known to impart adhesive qualities but only those having a solubility parameter in the range of about 8 to about 12, preferably in the range of about 8.5 to about 10. Adhesion promoting resins of the above type are predominately associated with the poly-(alpha-monoalkenyl arene) block of the block copolymers of this invention. Preferred adhesion promoting resins are coumarone-indene resins, thermoplastic polar hydrocarbon-rosin ester resins, terpene phenolic resins, alpha-methylstyrene/vinyl toluene copolymers and poly(alpha-methylstyrene). Commercial examples of these resins are Nevchem 140, Pexalyn A-960, Picco LTP-135, Piccotex 75 and Amoco 18-290.

The adhesion promoting resins are used in the composition at a level of about 1 to about 50 percent by weight, preferably about 10 to about 40 percent by weight and most preferably about 20 to about 30 percent by weight.

Fillers

The type of inorganic fillers used in the present invention is not critical. Almost any type of inorganic filler which will not interact with the other ingredients is acceptable. Preferred types of fillers are the metal oxides, carbonates and silicates. Preferred fillers are $CaCO_3$, $TiO_2$, ZnO, clay and talc.

The fillers may be a single ingredient or a combination of ingredients. The fillers are used at levels of about 1 to about 70 percent by weight, preferably about 10 to about 50 percent weight and most preferably about 20 to about 40 percent weight.

Stabilizers

The last component of the compositions of this invention is the oxidative stabilizer. This can be either a single stabilizer or a combination of stabilizers. The total stabilizer in the composition ranges from about 0.01 to about 2.0 percent by weight, preferably from about 0.1 to about 1.0 and most preferably from about 0.2 to about 0.4. Any acceptable stabilizer capable of protecting hydrocarbon polymers and hydrocarbons from oxidative degradation and UV light may be used. Preferred types of stabilizers are the hindered phenol types, the bisphenol epoxy type as described in U.S. Pat. No. 3,870,676 which issued Mar. 11, 1975 to N. J. Condon, the benzotriazole type and the nickel chelate type. Preferred stabilizers are Irganox 1010 (tetrakis-[methylene-(3,5-di-tertiary-butyl-4-hydroxy-hydrocinnamate)]methane, Ciba-Geigy Co.), Epon 1002 (epoxy resin ex Shell Chemical Co.), Cyasorb 1084 (2,2' thio-bis-(4-tertiary octylphenolate)-n-butylamine nickel(II), American Cyanamide Co.), Ethyl 330 (1,3,5-trimethyl-2,3,6-tris-(3',5'-di-tertiary butyl-4'-hydroxybenzyl)benzene, Ethyl Corp.) and Tinuvin 327 2-(2'-hydroxy-3',5'-di-tertiary butyl phenol)-7-chlorobenzotriazole, Ciba Geigy Co.) or mixtures thereof.

Method of Preparing S-EB-S Block Copolymer Sealants

Sealants employing the S-EB-S block copolymers may be made by any convenient method of mixing, batch or continuous, but certain methods reduce mixing time.

When the mixing is to be done with a batch mixer suitable for rubber compounding (e.g., sigma blade mixer) at a temperature below about 180°F the following is a preferred method and order of mixing the components;

1. Add S-EB-S block copolymer, any other type rubber to be used, any solvent to be used and stabilizers and blend for about 12 to about 18 minutes;
2. Add any resin with solubility parameter greater than about 8 and blend for about 12 to 18 minutes;
3. Add about one half of the filler to be added and blend for about 4 to about 6 minutes;
4. Add remaining portion of filler and blend for about 4 to about 6 minutes;
5. Add any resin with solubility parameter less than about 8 and blend for about 12 to about 18 minutes;
6. Add about ⅓ of the oil and blend for about 8 to about 12 minutes;
7. Add about ⅓ of the oil and blend for about 8 to about 12 minutes;
8. Add the remaining portion of the oil and blend until smooth.

If the temperature during mixing is to be between about 180°F and about 350°F, the following is the preferred method of blending;

1. Add S-EB-S block copolymer and any other rubber to be used, about ⅓ of the oil and the stabilizers and blend for about 8 to about 12 minutes;
2. Add any resin having a solubility parameter greater than about 8 and blend for about 8 to about 12 minutes;
3. Add about one half of the filler and blend for about 4 to about 6 minutes;
4. Add remaining portion of the filler and blend for about 4 to about 6 minutes;
5. Add any resin having a solubility parameter of less than about 8 and blend for about 4 to about 6 minutes;
6. Add remaining oil and blend for about 12 to about 18 minutes;
7. If solvent is to be added, cool the sealant to a temperature below the boiling point of the solvent and add the solvent over about a 30 minute period while blending;
8. After adding the solvent, blend for about 12 to about 18 minutes.

These procedures have proven to give sealants with superior adhesive properties when compared to the same sealant blended differently not only when the sealants are those of the present invention but also when the butyl rubber is left out of the composition or vinyl acetate polymers or amorphous polypropylene polymers are substituted for or included in addition to the butyl rubber in step one of the process.

Method of Applying the Block Copolymer Sealant

There are two general methods of applying sealants. The solvent-free sealant is applied in hot form for example, with a Hardman sealant applicator at 250°–400°F, or in order to achieve the needed flow characteristics a small amount of solvent is added to the sealant, preferably from about 5 to about 20 percent by weight based on total sealant, most preferably from about 10 to about 15 percent by weight, then the mastic is applied either cold or warm to the substrate and the solvent allowed to evaporate. Either one of these two methods may be used with the block copolymer sealants of this invention.

While the addition of any solvent capable of plasticizing the S-EB-S block copolymer based sealants will produce an acceptable mastic for application to a substrate certain solvents produce much better mastics then others. The preferred solvents are those that have a component which dissolves the end blocks of the S-EB-S block copolymer. A solvent having a boiling point of between about 60°C and about 160°C preferably between about 70°C and about 120°C and a component having a solubility parameter between about 8 and about 11, preferably between about 8 and about 10 gives a mastic that will form the best adhesive bonds when using a sealant of the present invention or any sealant based on a S-EB-S block copolymer rubber. The preferred components are the aromatics, acetates and ketones. Examples of preferred components having the required boiling point and solubility parameter are methyl ethyl ketone, diethyl ketone, toluene, ethyl acetate, and methyl isobutyl ketone.

The substrate on which the sealant system is to be applied can be any solid substance but is usually either metal, glass, wood, concrete, masonry or plastic. If a primer is to be applied to the surface of the substrate it may be applied by any method suitable for distributing it over the desired surface area. It may be painted, sprayed, rolled or wiped on or the substrate may be dipped into the primer. The coated substrate is allowed to stand until a major portion of the solvent has evaporated then the sealant is applied to the surface of the substrate covered by the primer either as a hot melt or as a plasticated mastic.

The following Illustrative Embodiments are presented for illustration only and should not be interpreted so as to limit the scope of this invention.

Illustrative Embodiment 1

The following components were blended in a sigma blade mixer at 140°C following the procedure given previously on pages 5 and 6 of this specification.

| Component | Example | Percent Weight |
|---|---|---|
| S-EB-S Polymer | S-EB-S(7.5M–37.5M–7.5M)[1] | 10 |
| Butyl Rubber | Exxon Butyl 077[2] | 10 |
| Plasticizing Oil | Indopol H-300[3] | 30 |
| Adhesive Resins | Picco LTP-135[4] | 20 |
| Inorganic Fillers | CaCO$_3$ | 17.73 |
| | TiO$_2$ | 6 |
| | ZnO | 6 |
| Stabilizers | Irganox 1010 | 0.05 |
| | Epon 1002 | 0.2 |
| | Cyasorb 1084 | 0.02 |

[1] Where numbers indicate the number average molecular weights of the block segments.
[2] General purpose, uncrosslinked butyl rubber (Exxon)
[3] Polybutene oligomer, viscosity at 38°C of 30,000 centistokes (Amoco)
[4] Terpene phenolic resin (Hercules)

The sealant composition had the following properties:

| Test | |
|---|---|
| Hardness, Shore A, Instantaneous[1] | 15 |
| Tensile Properties | |
| Modulus at 100% Elongation, psi[2] | 20 |
| Ultimate Tensile Strength, psi[2] | 120 |
| Elongation at Break, percent[2] | 1020 |

[1] Measured at 23°C using a Shore A durometer.
[2] Measured at 23°C on 1/16 inch thick dumbbell-shaped samples cut using a "D" die described in ASTM D412. Test according to ASTM D412 except for the crosshead speed which was 10 inches per minute.

Illustrative Embodiment 2

The following three sealant compositions were prepared as in Illustrative Embodiment 1.

| Component | Concentration, Percent Weight | | |
|---|---|---|---|
| | Sealant A | Sealant B | Sealant C |
| S-EB-S(7.5M–37.5M–7.5M) | 20 | 10 | 0 |
| Exxon butyl 077 | 0 | 10 | 20 |
| Indopol H-300 | 30 | 30 | 30 |
| Picco LTP-135 | 20 | 20 | 20 |
| Filler: | | | |
| CaCO$_3$ | 17.73 | 17.73 | 17.73 |
| TiO$_2$ | 6 | 6 | 6 |
| ZnO | 6 | 6 | 6 |
| Stabilizer: | | | |
| Trganox 1010 | 0.05 | 0.05 | 0.05 |
| Epon 1002 | 0.2 | 0.2 | 0.2 |
| Cyasorb 1084 | 0.02 | 0.02 | 0.02 |

180° peel strength samples were made with each of the 3 sealants on unprimed substrates using a Hardman hot-melt sealant applicator set at 350°F. The following peel strengths were measured on these samples.

| | 180° Peel Strength,[1] pli | | | |
|---|---|---|---|---|
| | On Aluminum | | On Glass | |
| Sealant | Unaged | After 7 Days In H$_2$O | Unaged | After 7 Days In H$_2$O |
| A | 2[a] | 1[a] | 2[a] | 1[a] |
| B | 10[a] | 34[c] | 25[c] | 27[c] |
| C | 6[c] | 10[c] | 7[c] | 11[c] |

[1] Measured according to Federal Spec TTS 00230, Section 4.3.10
[a] Adhesive failure
[c] Partial or complete cohesive failure of sealant All three sealants contain 20 percent by weight (%w) rubber total. Results show that sealant B containing 10 percent by weight S-EB-S and 10 percent by weight butyl has substantially better cohesive strength than sealant C. Sealant A has poor adhesive strength while the adhesive strengths of sealants B and C after 7 days in water were greater than the cohesive strengths of the sealant. This demonstrates the ability of butyl rubber to improve adhesion when added as a component in the sealant.

The adhesive strength of sealant A can be dramatically improved by priming the substrate before application of the sealant A. Typical primer to be used with sealant A will have the following composition:

| Component | Concentration, %w |
|---|---|
| Picco LTP-135 | 25 |
| NH$_2$—CH$_2$—CH$_2$—NH(CH$_2$)$_3$—Si(OCH$_3$)$_3$ | 0.12 |
| S-EB-S(7.5–37.5–7.5) | 10 |
| Irganox 1010 | 0.1 |
| Cyasorb 1084 | 0.05 |
| Xylene | Remainder |

180° peel samples were made by applying sealants A, B and C to substrates primed with the primer given as the typical example using the Hardman gun set at 350°F. The following data were obtained:

| | 180° Peel Strength, pli | | | | |
|---|---|---|---|---|---|
| | On Aluminum | | On Glass | | |
| Seal- ant | Un- aged | After 7 Days In H$_2$O | Un- aged | After 7 Days In H$_2$O | After 200 hours UV Thru glass |
| A | 28[a] | 54[a] | 74[c] | 57[a] | 18[b] |
| B | 16[c] | 28[c] | 20[c] | 28[c] | 30[c] |
| C | 6[c] | 9[c] | 7[c] | 10[c] | 11[c] |

[a] Adhesive failure sealant to primer
[b] Adhesive failure primer to substrate
[c] Partial or complete cohesive failure of sealant Samples to be run in the cyclic test procedure given in Federal Specification TTS-00230 were prepared by applying Sealants A, B and C to primed substrates using the Hardman gun set at 350°F. The following results were obtained:

| Seal- ant | Distortion After Aging 7 Days at 70°C | Rating After 10 Cycles of ± 25% Joint Movement at 23°C on Aluminum and Glass |
|---|---|---|
| A | None | Fail[a] |
| B | None | Pass |
| C | Melted | — |

[a] Adhesive failure primer to substrate

The results of the 180° peel strength test samples on primed substrates show that the primer causes a dramatic improvement in adhesive strength. Results of the cyclic tests show that sealant C is unsatisfactory for applications requiring exposure of the sealant to high temperatures because it melted on aging at 70°C. Neither Sealants A nor B shown any distortion on aging at 70°C. However, after aging at 70°C, sealant A, failed to survive 10 cycles of ± 25 percent joint movement at 23°C. The failure was adhesive on both glass and aluminum, primer to substrate.

It is therefore evident that sealant B is superior under the conditions most likely to be encountered in commercial use.

We claim as our invention:

1. An improvement in the method for making a sealant composition, said sealant comprising:
    A. about 3 to 30 percent by weight of an elastomeric poly(alpha-monoalkenyl arene)/hydrogenated poly(conjugated diene) block copolymer having at least two poly(alpha-monoalkenyl arene) blocks wherein the average molecular weight of the arene blocks is 4,000 to 50,000; the average molecular weight of the diene block is 18,000 to 250,000; the conjugated diene blocks contain at least 20% 1,2 bonds prior to hydrogenation; and at least 98% of the double bonds present in the conjugated diene blocks are saturated during hydrogenation,
    B. about 2 to 40 percent by weight of a butyl rubber,
    C. about 1 to about 70 percent by weight of an oil having a solubility parameter of from about 6 to about 8,
    D. about 1 to about 50 percent by weight of an adhesion promoting resin having a solubility parameter of from about 8 to about 12,
    E. about 0 to about 70 percent by weight of an inorganic filler, and
    F. about 0.01 to about 2.0 percent by weight of an oxidation stabilizer, which improvement comprises adding the components to a batch mixer in the following order:
    a. block copolymer, butyl rubber, about ⅓ of the oil and stabilizer;
    b. adhesive promoting resin;
    c. about one half of the filler;
    d. the remaining portion of the filler;
    e. the remaining portion of the oil.

2. The method of claim 1 where A is a polystyrene/hydrogenated polybutadiene/polystyrene linear block copolymer.

3. The method of claim 2 where B is an isobutylene-isoprene copolymer with a Mooney viscosity of from about 35 to about 55 ML cone after 8 minutes at 100°C.

4. The method of claim 3 where C is low molecular weight polybutene oligomer oil.

5. The method of claim 4 where D is a terpene phenolic resin.

6. The method of claim 5 where E is a mixture of $CaCO_3$, $TiO_2$ and ZnO.

7. The method of claim 6 where F is a mixture of tetrakis-[methylene-(3,5-di-tertiary-butyl-4-hydroxyhydrocinnamate)]methane, bisphenol epoxides, and, 2,2'thio-bis-(4-tertiaryoctylphenolate)-n-butylamine nickel(II).

* * * * *